No. 674,460. Patented May 21, 1901.
W. FULLER.
SEAT FOR AIR BLAST VALVES.
(Application filed Dec. 13, 1900.)
(No Model.) 2 Sheets—Sheet 1.
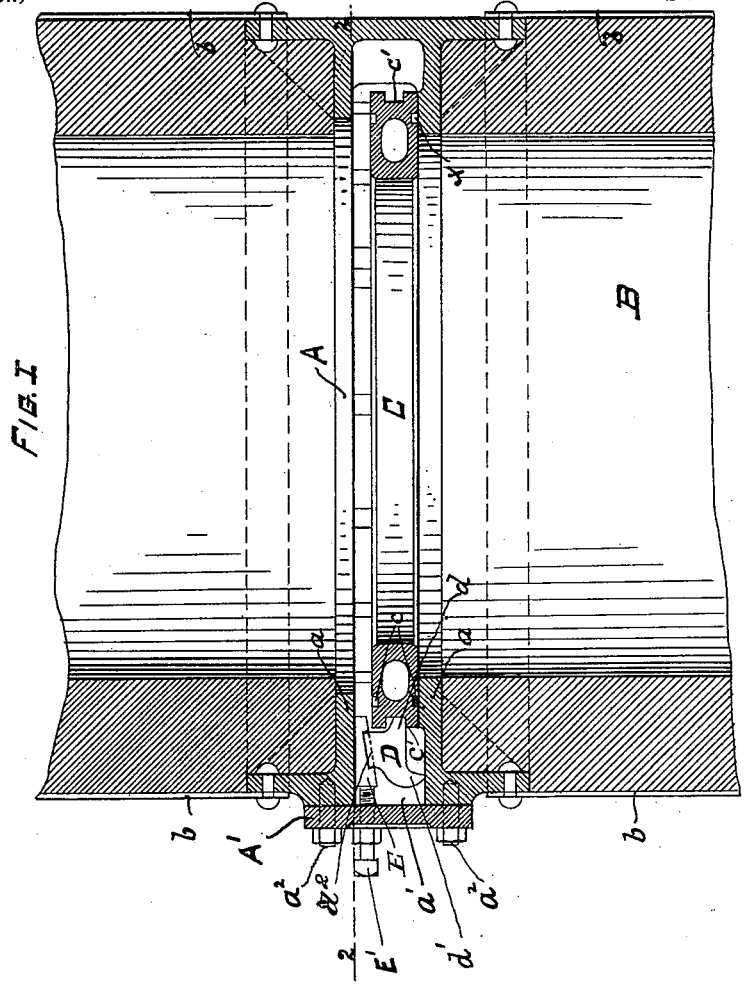
WITNESSES
INVENTOR
W. Fuller
PER J. D. Fay
ATTORNEY No. 674,460. Patented May 21, 1901.
W. FULLER.
SEAT FOR AIR BLAST VALVES.
(Application filed Dec. 13, 1900.)
(No Model.)
2 Sheets—Sheet 2.
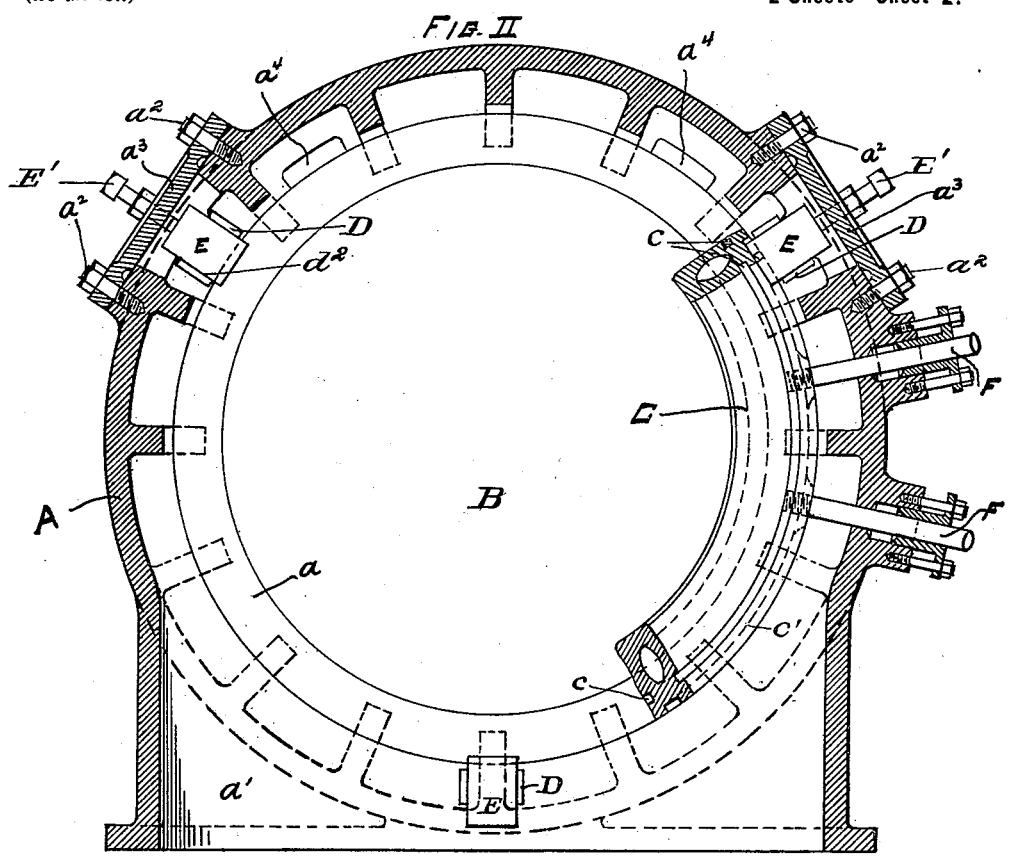
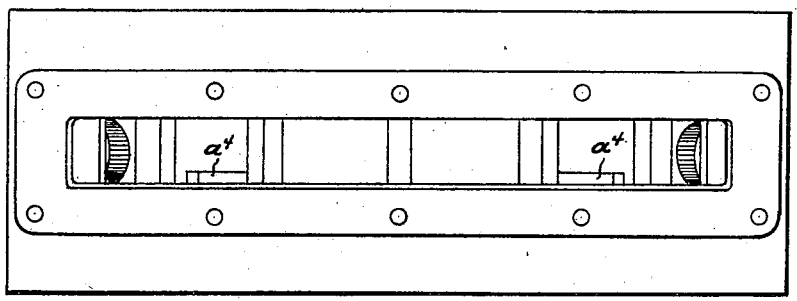
WITNESSES
Geo. Wm. Saywell
A. E. Merkel
INVENTOR
W. Fuller
PER J. D. Fay
ATTORNEY

UNITED STATES PATENT OFFICE.

WILLARD FULLER, OF CLEVELAND, OHIO.

SEAT FOR AIR-BLAST VALVES.

SPECIFICATION forming part of Letters Patent No. 674,460, dated May 21, 1901.

Application filed December 13, 1900. Serial No. 39,631. (No model.)

*To all whom it may concern:*

Be it known that I, WILLARD FULLER, a citizen of the United States, and a resident of Cleveland, county of Cuyahoga, and State of Ohio, have invented a new and useful Improvement in Seats for Air-Blast Valves, of which the following is a specification, the principle of the invention being herein explained and the best mode in which I have contemplated applying that principle, so as to distinguish it from other inventions.

My invention relates to removable valve-seats used in connection with valves for controlling the flow of fluids, and particularly for controlling the flow of air through hot-air-blast pipes.

The object of said invention is to provide means capable of rendering the valve-seat readily removable for the purpose of replacing or repairing same.

Said invention consists of means hereinafter fully described, and pointed out in the claims.

The annexed drawings and the following description set forth in detail certain mechanism embodying the invention, such disclosed means constituting but one of various mechanical forms in which the principle of the invention may be used.

In said annexed drawings, Figure I represents an axial cross-section of my improved valve-seat. Fig. II represents a transverse cross-section taken upon the plane indicated by line 2 2 in Fig. I, illustrating same with the valve-seat broken away. Fig. III represents a side elevation of the casing of said structure detached from the duct and having its cover and the valve-seat removed.

A casing A is formed with two annular inwardly-extending flanges $a$ $a$ and is of an outer diameter substantially equal to that of the air-duct B. Said casing is set in the inner brickwork of the duct and the metal plates $b$ riveted to the shell, as shown. One end of such casing is formed with a laterally-inclosed opening $a'$, which extends transversely with respect to the duct-axis and is provided with a removable cover $A'$, secured by means of stud-bolts $a^2$, Fig. I.

The valve-seat consists of an annular hollow metal ring C, formed with an annular gasket-groove $c$ upon each of its two faces and with circumferential recesses $c'$ on its periphery. Said seat is of a diameter such that it may be withdrawn from the casing through the opening $a'$ and is placed so as to rest upon one of the flanges $a$. At suitable intervals are placed means for securing said seat upon said flange. Said means each consist of a lug D, having an inner projection $d$ engaging one shoulder formed by a recess $c'$, and a foot $d'$, resting upon the flange $a$, which supports the seat, as shown in Fig. I. The opposite surface of the lug is formed with a groove $d^2$, in which rests a wedge E, whose outer surface is caused to engage the other flange $a$. At the points in the duct-shell opposite said wedges are formed openings $a^5$ $a^5$, provided with covers $a^3$ $a^3$, secured to the duct by means of bolts $a^2$. One wedge is placed in the middle of the opening $a'$, as shown in Fig. II. Opposite each of said wedges and passing through each cover is a threaded bolt E', whose inner end may be caused to engage the outer end of its contiguous wedge, whereby it is seen that the wedges may be adjusted from the exterior of the duct to securely clamp the seat in place. A suitable gasket or packing-ring of asbestos or similar packing substance is placed in the annular groove $c$ contiguous to the supporting-flange, so as to render its connection with said flange air-tight. Water connections F pass through the duct-shell and communicate with the hollow interior of the seat, the points of entrance being rendered air-tight by means of suitable glands and packing. Two stops $a^4$ are formed upon the supporting-flange $a$ opposite the opening $a'$ and permit of the ready placing of the valve-seat so as to properly register with the duct.

To remove the seat, the water connections and covers A' and $a^3$ $a^3$ are removed, whereupon the lugs D and wedges E are removed, whereupon the seat may be withdrawn through opening $a'$. To replace the seat, the latter is slid into the opening $a'$, placed upon the one flange $a$, the wedges and lugs placed in position, and the covers replaced. The bolts E' are thereupon screwed up against the wedges, thereby securing the seat firmly in place.

The above construction permits of the reversal of the valve-seat, so that when one side is worn, so as to become incapable of further use, the opposite side may be used.

Other modes of applying the principle of my invention may be employed instead of the one explained, change being made as regards the means herein disclosed, provided the means stated by any one of the following claims or the equivalent of such stated means be employed.

I therefore particularly point out and distinctly claim as my invention—

1. The combination of a fluid-duct provided with a lateral opening in its shell, a removable cover therefor, a valve-seat in said duct and removable from the latter through said opening and transversely of the valve-seat axis, a plurality of devices for securing said seat, and means for operating them from the exterior of said duct.

2. The combination of a fluid-duct provided with an opening in its shell having a direction transverse with respect to the duct-axis, a removable cover for said opening, a valve-seat in said duct and removable through said opening, and a plurality of adjustable wedge devices for securing said seat in the duct, said wedges provided with means projecting through the duct-walls whereby they may be adjusted from the exterior of the latter.

3. The combination of a fluid-duct provided with a transversely-located valve-seat casing having an end opening and removable cover therefor, and formed with an annular flange, a valve-seat independent of and removable from said casing and seated upon said flange, a plurality of adjustable wedges for engaging said seat to secure the latter upon said flange, and an adjusting-bolt projecting through the duct-shell and engaging each wedge whereby they may be adjusted from the exterior of the duct to secure said seat.

Signed by me this 1st day of December, 1900.

WILLARD FULLER.

Attest:
D. T. DAVIES,
GEO. WM. SAYWELL.